United States Patent Office 3,145,209
Patented Aug. 18, 1964

3,145,209
SUBSTITUTED AMINOPHENYL-ETHYLAMINE DERIVATIVES
John Krapcho, New Brunswick, N.J., assignor to Olin Mathieson Chemical Corporation, New York, N.Y., a corporation of Virginia
No Drawing. Filed July 31, 1961, Ser. No. 127,837
7 Claims. (Cl. 260—268)

This invention relates to new aminophenylethylamine derivatives and, more particularly, to compounds of the general formula

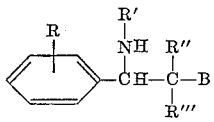

wherein R is hydrogen, lower alkyl (e.g. methyl, ethyl and isopropyl), halogen (e.g. chlorine and fluorine), halomethyl (e.g. trifluoromethyl), alkoxy (e.g. methoxy, ethoxy, propoxy and amyloxy), aryloxy (e.g. phenyloxy), hydroxy, amino, or dialkylamino (e.g. dimethylamino and diethylamino); R' is hydrogen, lower alkyl, monocyclic aryl lower alkyl or acyl; R" and R''' are lower alkyl, phenyl, or, together with the carbon to which they are joined, constitute a cycloalkyl radical (e.g. cyclohexyl, cyclopentyl and cycloheptyl); and B is a basic, nitrogen-containing radical such as alkylamino, dialkylamino (e.g. dimethylamino and diethylamino), alkylaralkylamino, piperidyl (e.g. piperidino), alkylpiperidyl (e.g., 2, 3, and 4-methylpiperidino), dialkylpiperidyl (e.g., 2,4- 2,6-, and 3,5-dimethylpiperidino); pyrrolidyl (e.g., pyrrolidino), alkylpyrrolidyl, dialkylpyrrolidyl, piperazinyl (e.g. piperazino), alkylpiperazinyl (e.g. 4-methylpiperazino), dialkylpiperazinyl, alkoxypiperazinyl and arylpiperazinyl (e.g., 4-phenylpiperazino); and the pharmaceutically acceptable acid-addition salts thereof.

Among the suitable acyl groups defined by R' may be mentioned R-substituted alkanoyl (e.g., acetyl, dichloroacetyl and propionyl), R-substituted alkenoyl (e.g., 3-butenoyl), R-substituted alkadienoyl (e.g.) sorboyl, R-substituted aralkanoyl (e.g., phenacetyl, α-phenylbutyroyl, diphenylacetyl, α-hydroxydiphenylacetyl, and α-ethoxydiphenylacetyl), R-substituted aralkenoyl (e.g., cinnamoyl), R-substituted aroyl (e.g., benzoyl, p-chlorobenzoyl and naphthoyl), carbamyl, dialkylcarbamyl (e.g. dimethylcarbamyl and diethylcarbamyl), diaryl carbamyl (e.g., diphenyl carbamyl) lower alkane sulfonyl (e.g., methanesulfonyl) and aryl sulfonyl (e.g., benzenesulfonyl), wherein R is as hereinbefore defined. The preferred compounds are those wherein R is hydrogen, R' is hydrogen, acetyl or phenacetyl, R" and R''' are lower alkyl and B is piperidino.

Examples of suitable acid-addition salts of this invention include the mineral acid salts, such as the hydrohalide (e.g., hydrochloride, hydrobromide and hydroiodide), the sulfate and the phosphate; and the organic acid salts, such as the citrate, tartrate, oxalate, ascorbate and succinate. Pharmacologically acceptable acids are, of course, employed where the salt form is prepared for therapeutic use.

The compounds employed as starting materials in the process of the present invention are prepared by the process described in my application, Serial No. 62,897, filed October 17, 1960, now U.S. Patent 3,068,236. This process comprises reacting an R-substituted phenyl lithium with a nitrile of the formula

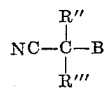

wherein R, R" and R''' and B have the values hereinbefore defined, and subjecting the resulting lithium complex to mild hydrolysis thereby providing an imine of the formula

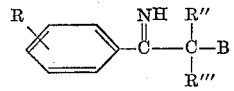

These imine derivatives are then converted to the compounds of this invention, wherein R' is hydrogen, by hydrogenating with hydrogen in the presence of a hydrogenation catalyst such as a noble metal catalyst (e.g., platinum oxide). The free amino compounds can then be readily converted to the N-substituted derivatives by treatment with an acylating agent such as an acyl halide (R' halide) or an acid anhydride (R')$_2$O, wherein R' is an acyl group as hereinbefore defined.

Those compounds of this invention wherein R' is lower alkyl or monocyclic aryl lower alkyl can then be prepared by reducing the corresponding N-acyl derivative. This reduction is preferably carried out by use of lithium aluminum hydride.

The compounds of this invention are physiologically active substances having central nervous system activity. Thus, these compounds can be used as anorectic agents in the treament and control of obesity. For such purposes the compounds of this invention are administered perorally with dosage adjusted for the particular activity of a given compound.

The following examples illustrate the invention (all temperatures given in degrees centigrade):

EXAMPLE 1

1-(2-Amino-1,1-Dimethylphenethyl)Piperidine,

A solution of 29.9 g. of 1-(2-imino-1,1-dimethylphenethyl)piperidine in 100 ml. of absolute alcohol is treated with 900 mg. of platinum oxide and the mixture placed in a hydrogenation apparatus under fifty-five pounds of hydrogen. The mixture is shaken and maintained at 50–53° for a period of five hours when the theoretical quantity of hydrogen is consumed. The catalyst is filtered and the solvent removed under reduced pressure. The residue is distilled at 105–107° (0.1 mm.) and cooled to give a colorless solid; M.P. about 56–59°. After crystallization from hexane, the product melts at about 61.5–63°.

EXAMPLE 2

1-(2-Amino-1,1-Dimethylphenethyl)Piperidine, Hydrochloride

A solution of 18.5 g. of material from Example 1 in 12 ml. of ethanol is treated with 31.6 ml. of 2.2 N alcohol hydrogen chloride. The colorless product which crystallizes from this solution melts at about 157–159° After recrystallization from ethanol, it melts at about 161–162°.

EXAMPLE 3

1-(2-Acetamido-1,1-Dimethylphenethyl)Piperidine, Hydrochloride

A cool solution of 19.2 g. of material from Example 1 in 200 ml. of benzene is treated dropwise with a solution of 7.8 g. of acetyl chloride in 50 ml. of benzene. The product separates from the mixture as a crystalline material.

EXAMPLE 4

1-(2-Phenacetylamido-1,1-Dimethylphenethyl)Piperidine, Hydrochloride

This product is obtained by substitution of 15.5 g. of phenylacetyl chloride for the acetyl chloride in Example 3.
By substituting for the acetyl chloride in Example 3, equivalent quantities of the following acyl chlorides: α- phenylbutyroyl chloride, diphenylacetyl chloride, α-hydroxydiphenylacetyl chloride, α-ethoxydiphenylacetyl chloride, dimethylcarbamyl chloride, and diphenylcarbamyl chloride, the hydrochloride salts of the following products are obtained:

1-(2-α-phenylbutyamido-1,1-dimethylphenethyl) piperidine;
1-(2-diphenylacetamido-1,1-dimethylphenethyl) piperidine;
1-(2-α-hydroxydiphenylacetamido-1,1-dimethylphenethyl)piperidine;
1-(2-α-ethoxydiphenylacetamido-1,1-dimethylphenethyl)piperidine;
1-(2-dimethylcarbamylamino-1,1-dimethylphenethyl) piperidine; and
1-(2-diphenylcarbamylamino-1,1-dimethylphenethyl) piperidine.

EXAMPLE 5

N-(2-Amino-1,1-Dimethylphenethyl)-Dimethylamine (a) *Preparation of N-(2-imino-1,1-dimethylphenethyl)-dimethylamine.*—A solution of phenyllithium (prepared from 27.7 g. of lithium and 312 g. of bromobenzene) in 1.4 l. of ether is stirred and treated dropwise with a solution of 112 g. of 2-dimethylamino-2-methylpropionitrile (J. Or. Chem. 18, 898 (1953)), over a 210-minute period while the mixture is gently refluxed. The heating is continued for an additional thirty minutes, cooled and poured into a mixture of 220 g. of ammonium chloride, 1400 ml. of water and 400 g. of cracked ice. This mixture is extracted four times with 300 ml. portions of ether and the combined extract dried over magnesium sulfate. After evaporation of the solvent, the residue is distilled to give about 160 g. of colorless liquid; B.P. about 95–96° (2 mm.).

(b) *Preparation of N-(2-amino-1,1-dimethylphenethyl)-dimethylamine.*—28.5 g. of material from part (a) is hydrogenated in the same manner as in Example 1 to give about 18.4 g. of colorless product; B.P. about 87–90° (0.5 mm.).

EXAMPLE 6

N-(2-Amino-1,1-Dimethylphenethyl)-Dimethylamine, Hydrochloride

A solution of 15.3 g. of material from Example 5 in 30 ml. of absolute alcohol is treated with 32 ml. of 2.2 N alcoholic hydrogen chloride, followed by dilution with 2.8 l. of ether to give about 13.0 g. of colorless solid, M.P. about 137–139°. After recrystallization from acetonitrile, the colorless product melts at about 140–141°.

EXAMPLE 7

1-(2-Cinnamoylamino-1,1-Dimethyl-2-Phenylethyl) Piperidine, Hydrochloride

Interaction of 34.7 g. of the amino compound from Example 2 with 25 g. of cinnamoyl chloride in benzene according to procedure described in Example 3 gives about 26 g. of colorless crystalline hydrochloride of 1-(2-cinnamoylamino-1,1-dimethyl-2-phenylethyl)piperidine.

EXAMPLE 8

1-(1,1-Dimethyl-2-Methanesulfonylamino-2-Phenylethyl)Piperidine, Hydrochloride Interaction of 33.5 g. of the amino compound from Example 2 with 16.5 g. of methanesulfonyl chloride in benzene in according to the procedure of Example 3 yields about 30 g. of solid material.

EXAMPLE 9

1-(1,1-Dimethyl-2-Benzenesulfonylamino-2-Phenylethyl)Piperidine Hydrochloride Substitution of an equivalent amount of benzenesulfonyl chloride for the methanesulfonyl chloride employed in Example 8 gives the colorless, crystalline hydrochloride of 1-(1,1-dimethyl-2-benzenesulfonylamino-2-phenylethyl)piperidine.

EXAMPLE 10

1-(2-p-Chlorobenzoylamino-1,1-Dimethyl-2-Phenylethyl)Piperidine Hydrochloride Interaction of 46.0 g. of the amino compound from Example 2 with 35.0 g. of p-chlorobenzoyl chloride in benzene according to the procedure in Example 3 yields the colorless crystalline hydrochloride of 1-(2-p-chlorobenzoylamino-1,1-dimethyl-2-phenylethyl)piperidine, hydrochloride.

EXAMPLE 11

1-(1,1-Dimethyl-2-Sorboylamino-2-Phenylethyl) Piperidine, Hydrochloride

Replacement of the acetyl chloride in Example 3 by 8.5 g. of sorboyl chloride gives the colorless crystalline hydrochloride of 1-(1,1-dimethyl-2-sorboylamino-2-phenylethyl)piperidine, hydrochloride.

EXAMPLE 12

1-(2-Dichloroacetylamino-1,1-Dimethyl-2-Phenylethyl) Piperidine, Hydrochloride Replacement of the acetyl chloride in Example 3 by 9.6 g. of dichloroacetyl chloride gives the colorless crystalline hydrochloride of 1-(2-dichloroacetylamino-1,1-dimethyl-2-phenylethyl)piperidine hydrochloride.

EXAMPLE 13

1-[2-Amino-1,1-Dimethyl-2-(4-Methoxyphenyl)Ethyl] Piperidine, Hydrochloride

Following the procedures of Examples 1 and 2 except for the substitution of an equivalent amount of 1-[2-imino-1,1-dimethyl-2-(4-methoxyphenyl)ethyl]piperidine for the 1-(2-imino-1,1-dimethylphenethyl)piperidine in Example 1, yields the product 1-[2-amino-1,1-dimethyl-2-(4-methoxyphenyl)ethyl]piperidine, hydrochloride.

Similarly, by substituting an equivalent amount of the following products:

1-[2-imino-1,1-dimethyl-2-(4-methylphenyl)ethyl] piperidine,
1-[2-imino-1,1-dimethyl-2-(2-fluorophenyl)ethyl] piperidine,
1-[2-imino-1,1-dimethyl-2-(3-trifluoromethylphenyl) ethyl]piperidine,
1-[2-imino-1,1-dimethyl-2-(2-phenoxyphenyl)ethyl] piperidine,
1-[2-imino-1,1-dimethyl-2-(2-hydroxyphenyl)ethyl] piperidine,
1-[2-imino-1,1-dimethyl-2-(4-aminophenyl)ethyl] piperidine, and
1-[2-imino-1,1-dimethyl-2-(4-dimethylaminophenyl) ethyl]piperidine, for the 1-(2-imino-1,1-dimethylphenethyl)piperidine in Example 1 and following the procedure of Examples 1 and 2 the hydrochloride salts of the following products are obtained, respectively:

1-[2-amino-1,1-dimethyl-2(4-methylphenyl)ethyl] piperidine,
1-[2-amino-1,1-dimethyl-2-(2-fluorophenyl)ethyl] piperidine,
1-[2-amino-1,1-dimethyl-2-(3-trifluoromethylphenyl) ethyl]piperidine,
1-[2-amino-1,1-dimethyl-2-(2-phenoxyphenyl)ethyl] piperidine,
1-[2-amino-1,1-dimethyl-2-(2-hydroxyphenyl)ethyl] piperidine,
1-[2-amino-1,1-dimethyl-2-(4-aminophenyl)ethyl] piperidine, and
1-[2-amino-1,1-dimethyl-2-(4-dimethylaminophenyl) ethyl]piperidine.

EXAMPLE 14

*1-(2-Amino-1,1-Dimethyl-2-Phenylethyl)-4-Methylpiperazine*

Following the procedure of Example 1 except substituting an equivalent amount of 1-(2-amino-1,1-dimethyl-2-phenylethyl)-4-methylpiperazine for the 1-1(2-imino-1,1-dimethylphenethyl)piperazine, 1-(2-amino-1,1-dimethyl-2-phenylethyl)-4-methylpiperazine is obtained.

EXAMPLE 15

*1 - (2 - Amino - 1,1 - Dimethyl-2-Phenylethyl)-4-Phenylpiperazine*

Following the procedure of Example 1 except substituting an equivalent amount of 1-(2-imino-1,1-dimethyl-2-phenylethyl)-4-phenylpiperazine for the 1-(2-imino-1,1-dimethylphenethyl)piperidine, 1 - (2-amino-1,1-dimethyl-2-phenylethyl)-4-phenylpiperazine is obtained.

EXAMPLE 16

*1-(2-Amino-1,1-Dimethyl-2-Phenylethyl)Pyrrolidine*

Following the procedure of Example 1 except substituting an equivalent amount of 1-(2-imino-1,1-dimethyl-2-phenylethyl)pyrrolidine for the 1-(2-imino-1,1-dimethylphenethyl)piperidine, 1 - (2-amino-1,1-dimethyl-2-phenylethyl)pyrrolidine is obtained.

EXAMPLE 17

*N-(2-Amino-1,1-Dimethyl-2-Phenethyl)-N-Methylbenzylamine*

Following the procedure of Example 1 except substituting an equivalent amount of N-(2-imino-1,1-dimethyl-2-phenethyl)-N-methylbenzylamine for the 1-(2-imino1,1-dimethylphenethyl)piperidine, N - (2-amino-1,1-dimethyl-2-phenethyl)-N-methylbenzylamine is obtained.

EXAMPLE 18

*N-(2-Amino-1,1-Dimethyl-2-Phenylethyl)Diethylamine*

Following the procedure of Example 1 except substituting an equivalent amount of N-(2-imino-1,1-dimethyl-2-phenylethyl)diethylamine for the 1-(2-imino-1,1-dimethylphenethyl)piperidine, N-(2-amino-1,1-dimethyl-2-phenylethyl)diethylamine is obtained.

EXAMPLE 19

*1-(1-α-Aminobenzylcyclohexyl)Piperidine*

Following the procedure of Example 1 except substituting an equivalent amount of 1-(1-benzimidoylcyclohexyl)piperidine for the 1-(2-imino-1,1-dimethylphenethyl)piperidine, 1-(1-α-aminobenzylcyclohexyl)piperidine is obtained.

EXAMPLE 20

*1-(1-α-Acetamidobenzylcyclohexyl)Piperidine*

Following the procedure of Example 3 but substituting an equivalent amount of 1-(1-α-aminobenzylcyclohexyl)piperidine for the 1-(2-imino-1,1-dimethylphenethyl)piperidine hydrochloride, 1-(α-acetamidobenzylcyclohexyl)piperdine is obtained.

EXAMPLE 21

*N-(2-Amino-1-Methyl-1,2-Diphenylethyl)Dimethylamine, Hydrochloride*

Following the procedures of Examples 1 and 2 but substituting an equavalent amount of N-(2-imino-1-methyl-1,2-diphenylethyl)dimethylamine for the 1-(2-imino-1,1-dimethylphenethyl)piperidine in Example 1, N-(2-amino-1-methyl-1,2-diphenylethyl)dimethylamine hydrochloride is obtained.

EXAMPLE 22

*1-(2-Ethylamino-1,1-Dimethylphenethyl)Piperidine Hydrochloride*

A suspension of 31.0 g. of 1-(2-acetamido-1,1-dimethylphenethyl)piperidine hydrochloride in 50 ml. of water is treated with a solution of 13.8 g. of potassium carbonate in 30 ml. of water. The liberated base is extracted three times with 200 ml. portions of ether and the combined extracts dried over magnesium sulfate. The solution is filtered and added dropwise to a suspension of 4.0 g. of lithium aluminum hydride in 500 ml. of ether. The mixture is stirred for eight hours at room temperature, cooled and treated with a solution of 1.0 g. of sodium hydroxide in 50 ml. of water. The mixture is filtered and the filtrate dried over magnesium sulfate. This solution upon treatment with ethereal hydrogen chloride gives the hydrochloride salt.

EXAMPLE 23

*1-(2-Phenethylamino-1,1-Dimethylphenethyl)Piperidine Hydrochloride*

Following the procedure of Example 22 but substituting 35 g. of 1-(2-phenacetylamido-1,1-dimethylphenethyl)piperidine hydrochloride for the 1-(2-acetamido-1,1-dimethylphenethyl)piperidine hydrochloride, 1-(2-phenethylamino-1,1-dimethylphenethyl)piperidine hydrochloride is obtained.

EXAMPLE 24

*N-(2-Amino-1,1-Dimethyl-2-Phenethyl)-N-Methylamine*

A solution of 25 g. of N-(2-amino-1,1-dimethyl-2-phenethyl)-N-methylbenzylamine in 200 ml. of ethanol is treated with 3 g. of 5% palladium-carbon and placed in a hydrogenation apparatus at 55 pounds pressure of hydrogen. The mixture is shaken until one equivalent of hydrogen is consumed, filtered, and the solvent evaporated to give N-(2-amino-1,1-dimethyl-2-phenethyl)-N-methylamine.

This invention may be variously otherwise embodied within the scope of the appended claims.

What is claimed is:

1. A compound of the formula

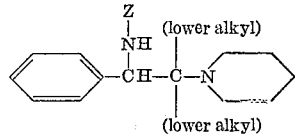

wherein Z is selected from the group consisting of hydrogen, acetyl and phenacetyl.

2. 1 - (2 - amino - 1,1-dimethyl-2-phenylethyl)piperidine hydrochloride.

3. 1 - (2 - acetamido - 1,1 - dimethyl-2-phenylethyl)piperidine hydrochloride.

4. 1 - ( 1,1 - dimethyl-2-phenacetylamido-2-phenylethyl)piperidine hydrochloride.

5. 1 - (2 - amino - 1,1 - dimethyl - 2 - phenylethyl)-4-phenylpiperazine.

6. 1 - (1 - α - aminobenzylcyclohexyl)piperidine.

7. 1 - (2 - cinnamoylamino - 1,1-dimethyl-2-phenylethyl)piperidine.

References Cited in the file of this patent

UNITED STATES PATENTS

| | | |
|---|---|---|
| 2,514,380 | Duschinsky | July 11, 1950 |
| 2,850,498 | Pohland | Sept. 2, 1958 |
| 2,860,166 | Newcomer et al. | Nov. 11, 1958 |

OTHER REFERENCES

Cromwell et al.: Journal of the American Chemical Society, volume 66, pages 870–871 (1944).

Degering: An Outline of Organic Nitrogen Compounds (a textbook), 1945 edition, page 204.